Sept. 20, 1955 G. E. READ ET AL 2,718,188
AUTOMATIC HAMBURGER PREPARING APPARATUS
Filed Dec. 23, 1952 6 Sheets-Sheet 2
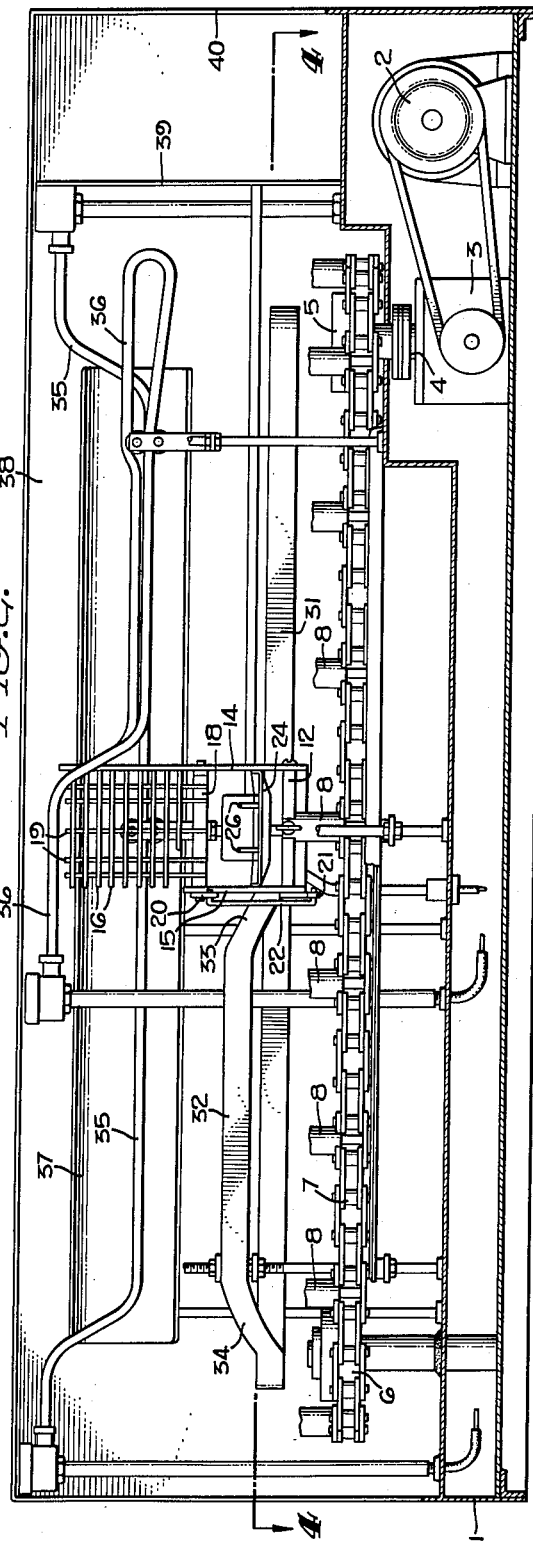
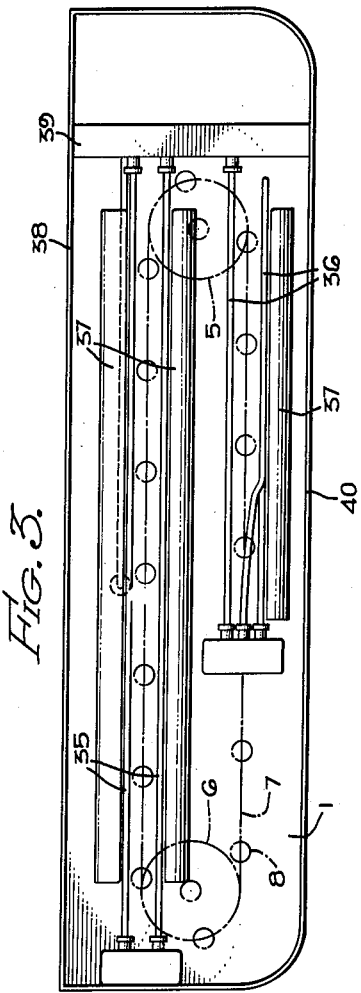
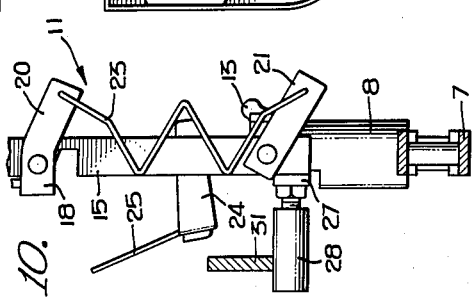
INVENTORS
GEORGE E. REED
LOWELL ELLIOT THOMPSON
WARREN W. GOLLOS
BY
ATTORNEYS

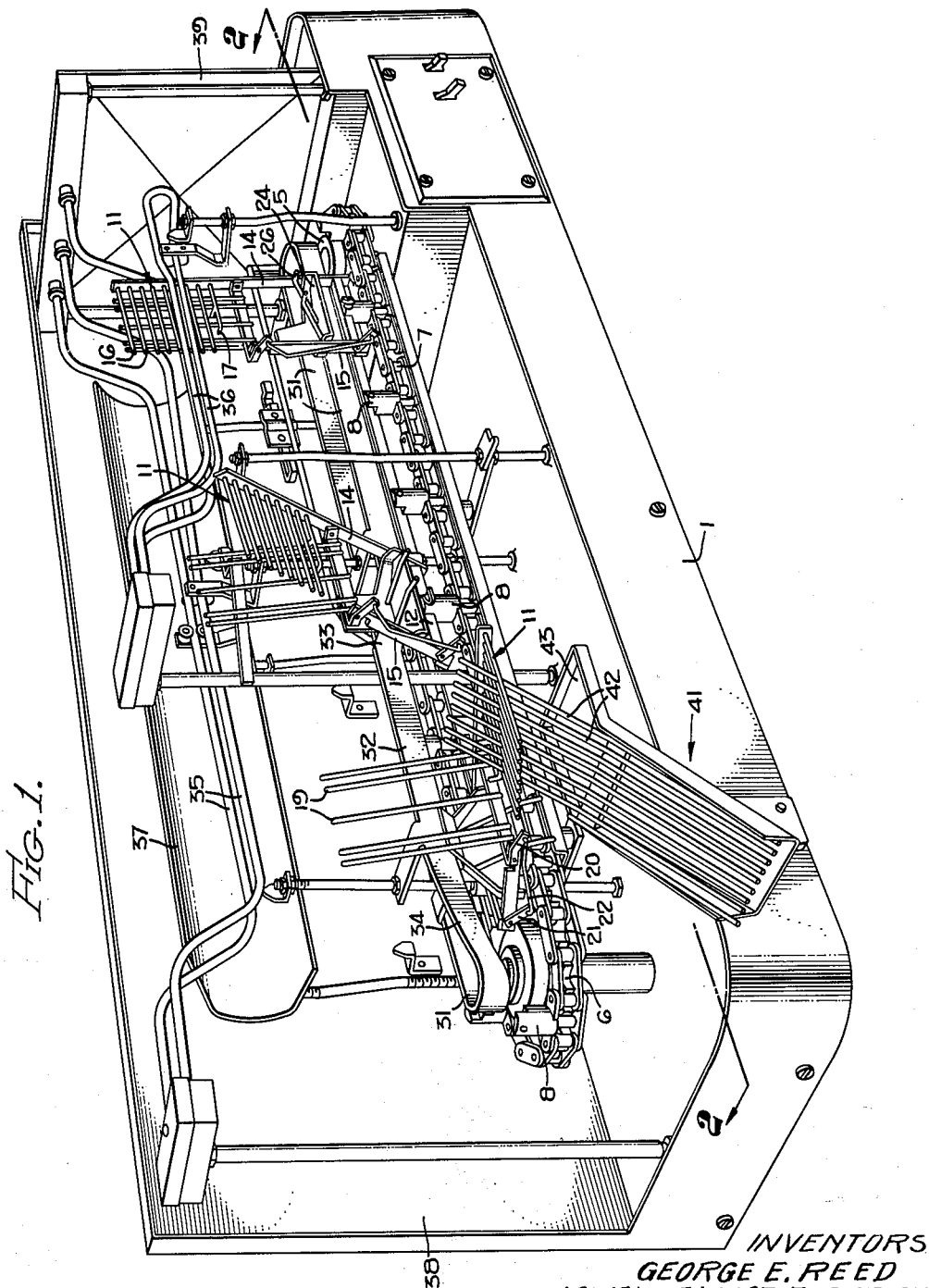

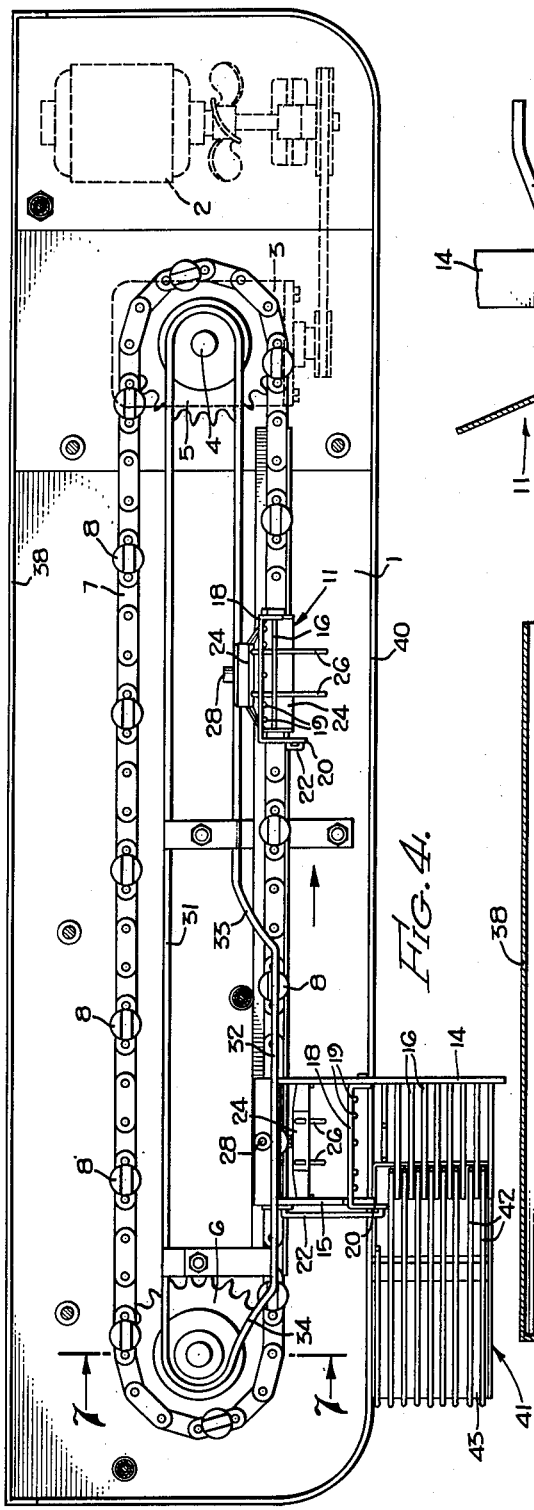
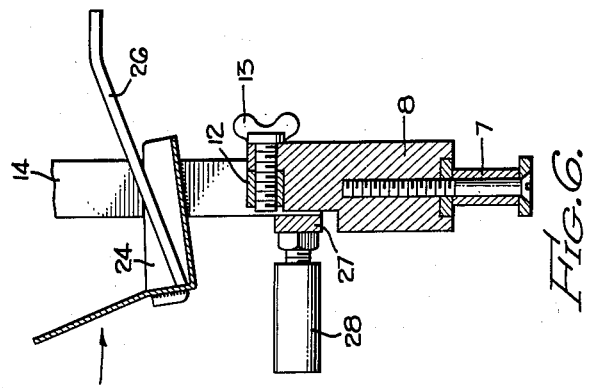
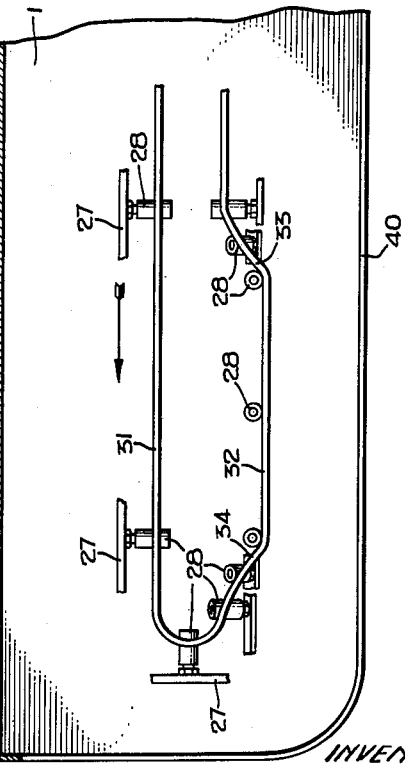
INVENTORS
GEORGE E. REED
LOWELL ELLIOT THOMPSON
WARREN W. GOLLOS
BY Lyon & Lyon
ATTORNEYS

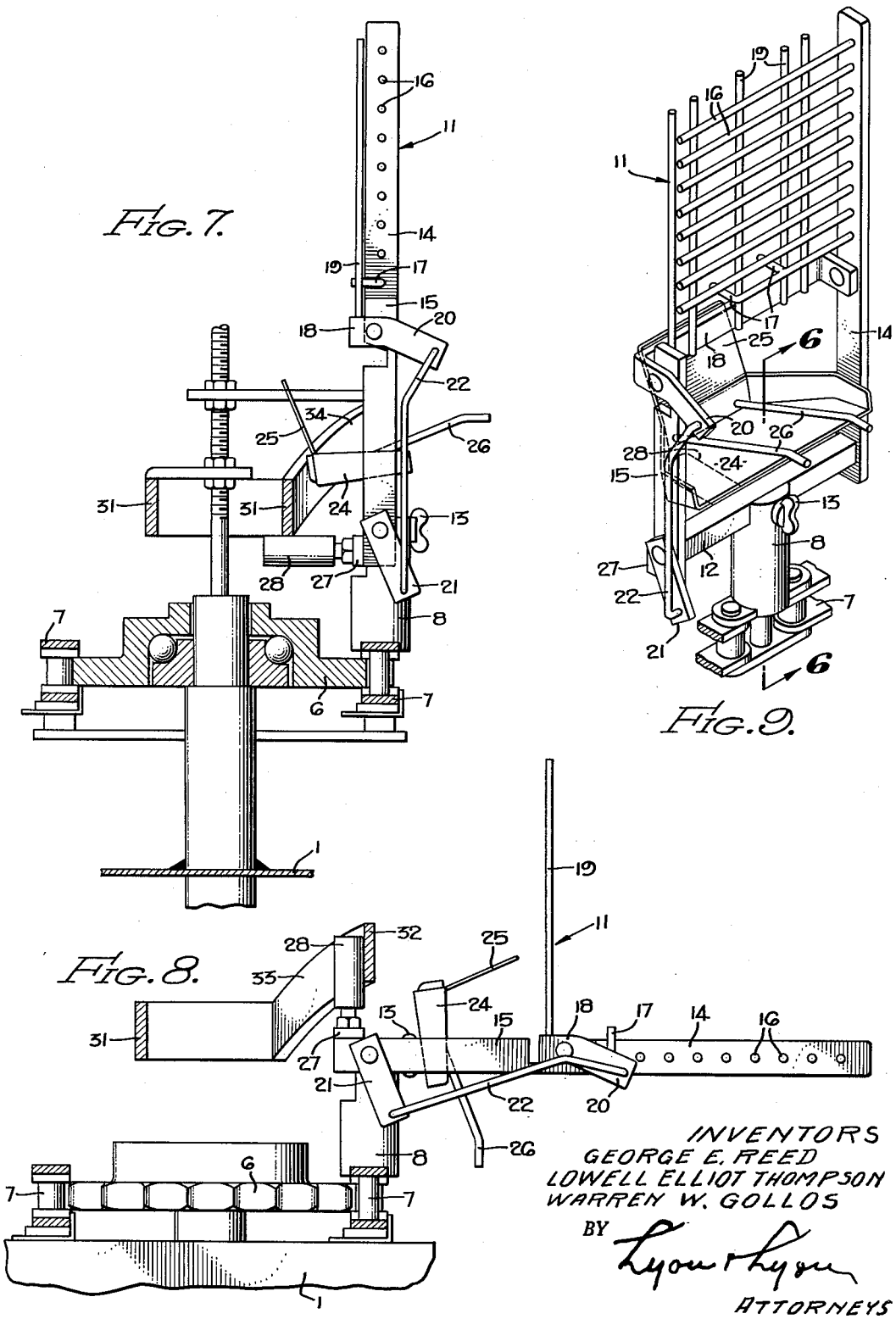

Sept. 20, 1955 G. E. READ ET AL 2,718,188
AUTOMATIC HAMBURGER PREPARING APPARATUS
Filed Dec. 23, 1952 6 Sheets-Sheet 5
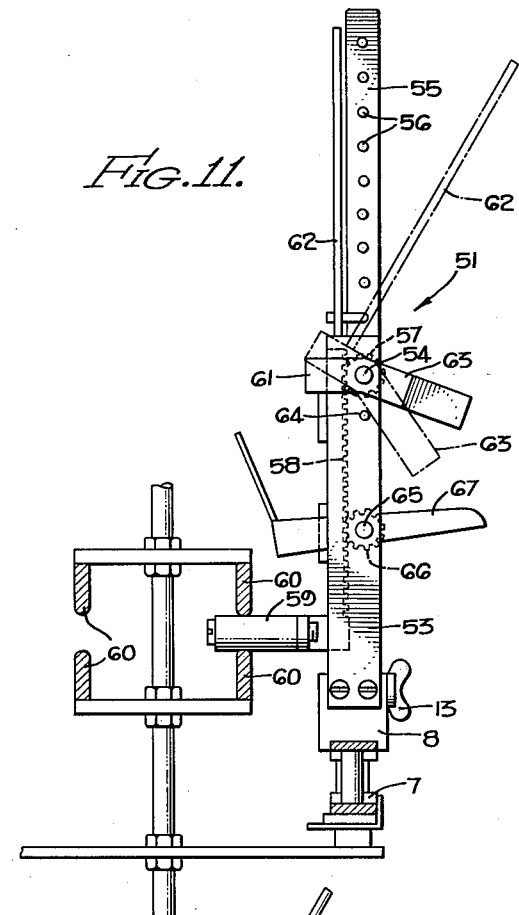
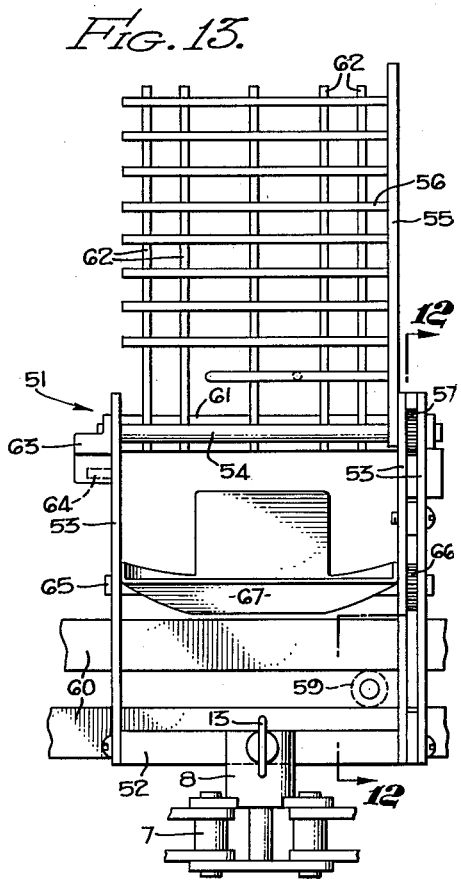
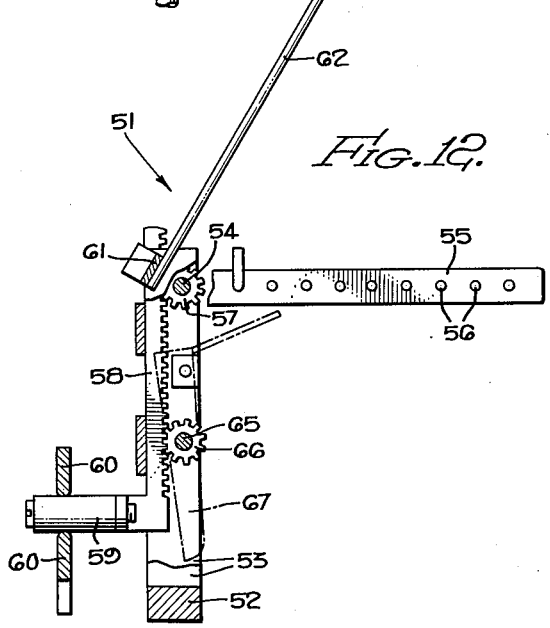
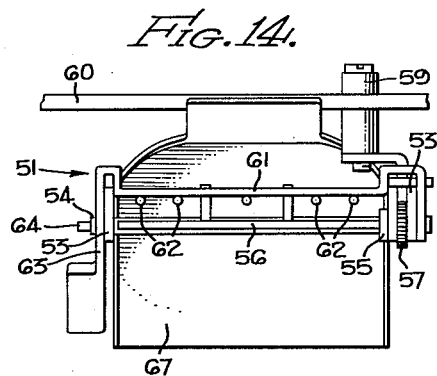
INVENTORS
GEORGE E. READ
LOWELL ELLIOT THOMPSON
WARREN W. GOLLOS
BY Lyon & Lyon
ATTORNEYS Sept. 20, 1955      G. E. READ ET AL      2,718,188
AUTOMATIC HAMBURGER PREPARING APPARATUS
Filed Dec. 23, 1952      6 Sheets-Sheet 6

INVENTORS
GEORGE E. READ
LOWELL ELLIOTT THOMPSON
WARREN W. GOLLOS
BY
Lyon & Lyon
ATTORNEYS United States Patent Office 2,718,188
Patented Sept. 20, 1955

2,718,188

AUTOMATIC HAMBURGER PREPARING APPARATUS

George E. Read, Lowell Elliot Thompson, and Warren W. Gollos, Los Angeles, Calif., assignors to said Warren W. Gollos, Los Angeles, Calif., as trustee Application December 23, 1952, Serial No. 327,506

11 Claims. (Cl. 99—386)

Our invention relates to automatic hamburger preparing apparatus and included in the objects of our invention are:

First, to provide an apparatus of this class which simultaneously exposes both sides of a hamburger patty to cooking temperatures as well as exposing the sliced sides of the hamburger bun to appropriate toasting temperatures, the bun being so disposed that it receives and retains a substantial proportion of any juices which drip from the cooking hamburger patty.

Second, to provide an apparatus of this class which may readily and quickly be loaded with hamburger patties and hamburger buns and thereafter performs the entire cooking operation including discharge of the patty and bun for assembly into a hamburger sandwich.

Third, to provide an automatic hamburger preparing apparatus which is capable of extremely high production rates, when operated at full capacity, and which is capable of operating efficiently at reduced capacity without reducing the quality of the product, thus providing an apparatus which readily accommodates itself to fluctuating demands.

Fourth, to provide an automatic hamburger preparing apparatus which incorporates a novel means for clamping and holding a hamburger patty in a vertical position during the cooking operation and a novel means whereby the hamburger patty is stripped from the clamping means intact and discharged from the apparatus.

Fifth, to provide an automatic hamburger preparing apparatus which in relation to its production capacity is particularly compact.

Sixth, to provide an automatic hamburger preparing apparatus which may be substantially enclosed, yet the parts or subassemblies are readily accessible, and in particular the subassemblies which come in contact with the food may be readily removed, cleaned and replaced.

With the above and other objects in view as may appear hereinafter, reference is directed to the accompanying drawings in which:

Figure 1 is a perspective view of our automatic hamburger preparing apparatus with the cover or housing removed and with several of the hamburger patty clamping units omitted to simplify the illustration.

Figure 2 is a sectional view of our automatic hamburger preparing apparatus taken substantially along the line 2—2 of Figure 1, all but one of the hamburger patty clamping units being removed to simplify the illustration.

Figure 3 is a reduced substantially diagrammatical plan view with the conveyer indicated by broken lines and showing particularly one arrangement of the heating elements employed to cook the hamburger patties as carried by the conveyer.

Figure 4 is a sectional view through 4—4 of Figure 2 with several of the hamburger patty clamping units removed to simplify the illustration.

Figure 5 is a fragmentary substantially diagrammatical view showing particularly the interaction of the cam disposed in fixed relation to the conveyer and the cam followers associated with the several hamburger patty clamping units.

Figure 6 is a fragmentary sectional view through 6—6 of Figure 9 showing the manner in which a clamping unit is fastened to the conveyer.

Figure 7 is a sectional view through 7—7 of Figure 4 showing the conveyer structure and one of the hamburger patty clamping units in its clamping position immediately before moving to its unloading position.

Figure 8 is a sectional view similar to Figure 7 but showing the hamburger patty clamping unit after it has moved forward to its unloading position.

Figure 9 is a perspective view of one of the hamburger patty clamping units shown in its clamping position and indicating fragmentarily the adjacent portions of the conveyer chain.

Figure 10 is a fragmentary side view of one of the clamping units showing a modified spring link member connecting cooperating elements of the clamping unit.

Figure 11 is a sectional view similar to Figure 7 showing a modified form of a hamburger patty clamping unit.

Figure 12 is a fragmentary sectional view taken through 12—12 of Figure 13 showing the modified hamburger patty clamping unit in its unloading position.

Figure 13 is a front view of the modified hamburger patty clamping unit at right angles to Figure 11.

Figure 14 is a top or plan view thereof.

Figure 15:
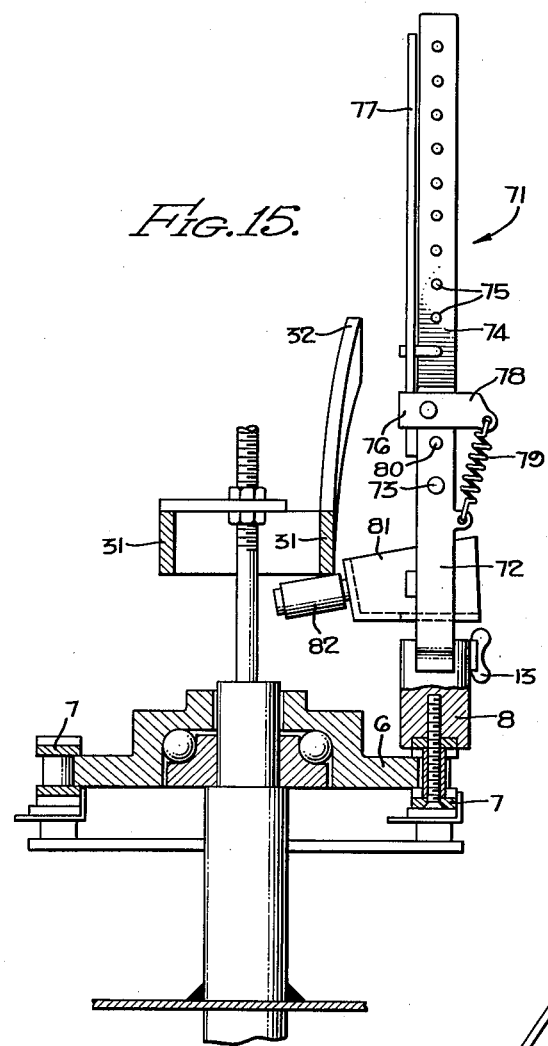
Figure 15 is a fragmentary sectional view simular to Figures 7 and 11 showing a further modified form of my hamburger patty clamping unit.

Our automatic hamburger preparing apparatus includes a substantially rectangular base structure 1 which serves as a housing for a motor 2 and gear drive unit 3 arranged to rotate with upright drive shaft 4 protruding upwardly through the base structure near one end thereof.

The drive shaft 4 receives a drive sprocket 5. Located near the opposite end of the base structure 1 is an idler sprocket 6. A conveyer chain 7 extends around these sprockets to form a front reach and a rear reach. The conveyer chain is provided with a series of short pedestals or mounting members 8.

Each pedestal 8 supports a patty and bun carrier assembly 11. Each assembly 11 includes a crossbar 12 which is secured to the pedestal by a screw 13, preferably a thumb screw, so that the assembly can be readily removed or attached.

The crossbar 12 extends parallel to the conveyer chain and pivotally supports at its extremities a leading bar 14 and a trailing bar 15. The leading bar 14 projects above the trailing bar 15 and is provided with a series of cross grid rods or tines 16 disposed in parallel relation and trailing from the bar with respect to the direction of travel of the assembly. The lower cross grid rod or tine is provided with a pair of laterally directed stops or projections 17.

The upper extremity of the trailing bar 15 and the corresponding point on the leading bar 14 are joined by a pivotally mounted U-shaped bracket member 18. That portion of the bracket member extending between the bars 14 and 15 is provided with upright grid rods or tines 19 which, when the assembly is in its clamping position, are offset from and define a plane parallel to the cross grid rods 16. As will be brought out hereinafter, a hamburger patty is intended to be clamped between the grid rods 16 and 19.

One extremity of the bracket member 18 is provided with a lever arm 20. The corresponding extremity of the crossbar 12 projects through the trailing bar 15 and is provided with a fixed lever arm 21. The two lever arms are joined by a link rod 22. The relationship of the arms 20 and 21 is such that when the leading and trailing bars 14 and 15 are pivoted between an upright position such as shown in Figure 8, the grid rods 19 remain in a substantially upright position while the cross grid rods move to a horizontal position.

In order to provide a yieldable connection between the lever arms 20 and 21 the link rod 22 may be bent as shown in Figures 7 and 8 or a marcel spring 23 may be employed as shown in Figure 10.

Supported between the leading and trailing bars 14 and 15 below the bracket member 18 is a hamburger bun receiving tray 24 open at its forward side facing away from the conveyer and having a rim around its rearward side. In addition the tray may have at the center of its rearward side an upwardly directed stop or deflector 25. Also to facilitate supporting a hamburger bun the bun tray may be provided with forwardly directed supporting fingers 26. The manner in which the bun tray is used will be described in more detail hereinafter.

The leading and trailing bars 14 and 15 are rigidly connected adjacent their lower ends by a cross brace 27 which supports a rearwardly extending cam follower 28 in the form of a roller.

Supported by suitable pedestals extending from the base structure 1 is a cam track 31 which follows the contour of the conveyer chain. The cam track 31 is formed from a strip of metal and the major portion thereof is in uniform relation to the conveyer chain being disposed above and inside the chain. One section of the track indicated by 32 is offset upwardly and forwardly from the remaining portion of the track and is connected thereto by transition sections 33 and 34. The normal or lower section of the cam track is so located as to be engaged by the cam followers 28 and act through the cam followers to hold the carrier assembly in its closed position shown in Figure 7. When the cam follower traverses the transition section 33, the cam permits the bars 14 and 15 to tilt from their vertical position shown in Figure 7 to their horizontal position shown in Figure 8. The bars are maintained in the position shown in Figure 8 during passage of the assembly along the elevated section 32 of the track. Upon traversing the transition section 34 the bars 14 and 15 move from their horizontal position shown in Figure 8 back to their vertical position shown in Figure 7.

The assemblies 11 are preferably so arranged that they move to the horizontal position indicated by gravity. However, they may be urged to such position by spring action or by cam sections complementary to the transition sections and intervening section of the cam track.

Disposed on suitable supports above the conveyer chain so as to confront opposite sides of the grids 16 and 19 when the carrier assemblies are in their upright position shown in Figure 7 are one or more sets of cooking elements 35 in the form of resistance rods 36. The cooking elements may be backed by suitable reflectors 37.

The base structure 1 may be provided with a rear or back wall 38 and an end wall 39. The remaining portion of the conveyor and associated elements may be enclosed in a shell or housing 40. The shell or housing is provided with an open section in the region opposite the raised section 32 of the cam track.

Located opposite the elevated section 32 of the cam track preferably adjacent the transition section 33 is a hamburger patty stripping assembly 41. This assembly includes a plurality of parallel, angularly directed rods 42 so located that the cross grid rods or tines 16 intermesh therewith as these tines move from the vertical position shown in Figure 7 to the horizontal position shown in Figure 8. This interaction with the stripping rods 42 causes the rods 42 to lift or strip the hamburger patty from the tines 16. By reason of the fact that the stripping rods 42 are disposed at a substantial incline, the hamburger patty slides down the rods and into a suitable receptacle (not shown). A drip pan 43 is disposed under the stripping rods. The upper portion of the drip pan is so positioned as to clear the cross grid rods 16.

Operation of my automatic hamburger preparing apparatus is as follows:

In normal operation the conveyer operates continuously. Immediately after a carrier assembly 11 has cleared the stripper assembly a hamburger patty is placed on the cross grid rods or tines 16 before these tines are raised to their vertical position. Immediately after or during movement of the carrier assembly past the transition section 34 of the cam track 31 a hamburger bun is placed in the tray 24. The bun has been previously sliced and the slices arranged back to back so that the crust sides are adjacent and the open sides are outermost. The upper half of the hamburger bun underlies the hamburger patty in position to receive drippings therefrom.

When the assembly 11 is in its operation position shown in Figure 7 the hamburger bun is disposed at a slight angle and the hamburger patty is vertically disposed. While held in such position the conveyer moves the carrier assembly between the cooking elements 35 and 36. The principal portion of the available heat is applied to the hamburger patty. However, the upwardly exposed surface of the hamburger bun is toasted or at least warmed. This is to some extent true of the lower half of the hamburger bun which rests on the fingers 26. If desired, a special cooking element may be so located as to apply heat directly to the underside of the hamburger bun.

While the hamburger patty is being cooked it is carried by the conveyer along the remainder of the forward reach, around the drive sprocket, then along the rearward reach and around the idler sprocket to the transition section 33 of the cam track. As each carrier assembly passes this section the cross grid rods 16 are moved from the vertical position shown in Figure 7 to the horizontal position shown in Figure 8, and in so moving intermesh with the stripping rods 42 so that the hamburger patty is delivered to a suitable receptacle. Simultaneously the hamburger bun tray is tilted discharging the hamburger bun into a second receptacle located below and beyond the drip pan 43 of the stripping assembly 41. The carrier is then ready to receive another hamburger patty and bun.

Reference is now directed to Figures 11–14 which illustrate a modified form of the hamburger patty and bun carrying assembly designated generally by the reference character 51. The modified carrier assembly includes a cross bar 52 which fastens to the pedestal 8 in the manner of the first described assembly.

Connected to the crossbar 52 are a pair of up-rights 53. A shaft 54 extends between the upper extremities of the uprights 53. An end bar 55 is secured to the shaft and extends laterally therefrom. The end bar 55 is provided with a plurality of cross grid rods or tines 56 which extend horizontally. The end bar 55 is capable of movement from an upright position shown in Figure 11 to a horizontal position shown in Figure 12. This movement is accomplished by means of a pinion gear 57 provided at one end of the shaft 54 and operated by a rack 58 disposed along one of the uprights 53. For purposes of guiding the rack 58 this upright comprises the two parallel members forming a slot to receive the pinion gear and the rack.

Attached to the lower end of the rack 58 is a cam follower roller 59 which projects horizontally and rides in a slot formed between confronting cam track members 60. The cam track members 60 are located in substantially the same position relative to the conveyer chain as in the first described structure and include an elevated section and a transition section (not shown) arranged to move the cam follower between a normal or lower position shown in Figure 11 and an upper position shown in Figure 12.

The upper extremities of the uprights 53 are joined by a crossbar 61 which may pivot on the extremities of the shaft 54. The crossbar 61 carries a plurality of vertically extending grid rods 62. Normally these grid rods occupy a true vertical position. However, they are capable of tilting forwardly as indicated in Figure 12. One end of the crossbar 61 is provided with an arm 63 the extremity of which is weighted and projects forward so that the grid rods or tines 62 tend to tilt forward to the broken line position shown in Figure 11 or the solid line position shown in Figure 12. This forward tilting movement is limited by a stop pin 64.

A second shaft 65 is mounted below the shaft 54 and is provided with a pinion 66 which is also engaged by the rack 58. Secured to the shaft 65 is a bun tray 67 which may be similar to the bun tray 35. Vertical movement of the rack 58 causes the bun tray 67 to tilt as indicated by broken lines in Figure 12.

Operation of the modified carrier assembly 51 is essentially the same as the first described structure. That is, the cross grid tines 56 in moving from the vertical position shown in Figure 11 to the horizontal position shown in Figure 12 intermesh with the stripping rods 42 so that the hamburger patty is removed therefrom. The tilting movement of the vertical grid rods 62 aid in removing the hamburger patty from these rods so that they are retained on the cross grid rods 56.

Figure 16:
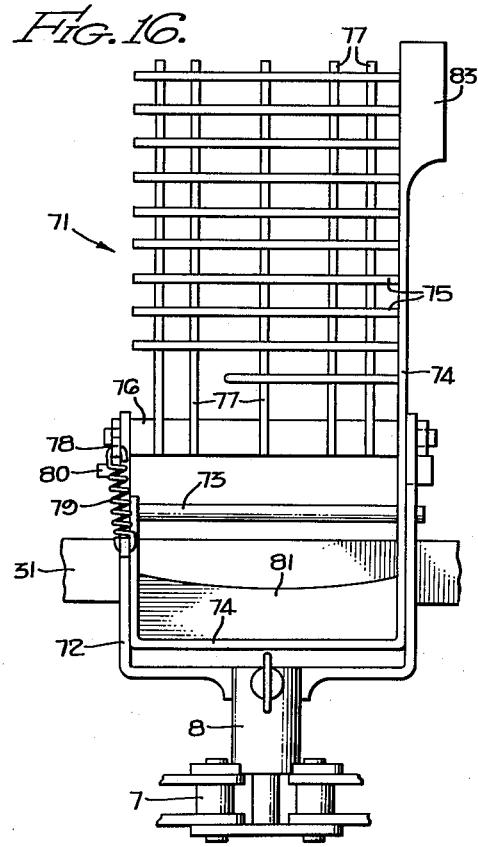
Figure 16 is a front view thereof at right angles to Figure 15.
Figure 17:
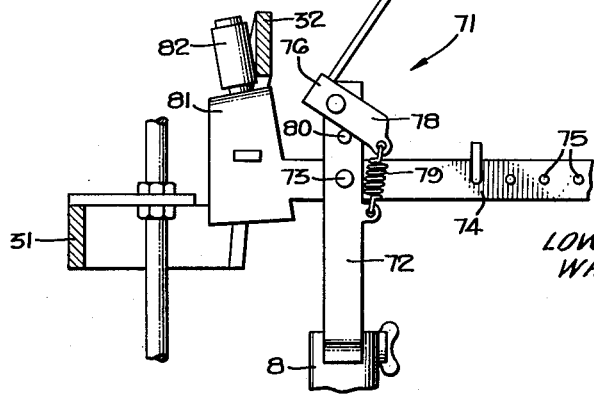
Figure 17 is a fragmentary sectional view similar to Figure 15 showing the hamburger patty clamping unit in its unloading position.

Reference is now directed to Figures 15–17 inclusive which show a further modified form of hamburger patty and bun carrier assembly designated generally by the reference character 71. This construction utilizes the same track 31 of the first described structure and includes a U-shaped yoke 72, a cross member of which is adapted to be fastened into a pedestal in the manner of the first described structure.

The yoke 72 which is fixed is provided adjacent the extremity of its legs with a shaft 73 which journals a pivoted yoke 74, one leg of which is longer than the other and carries a plurality of horizontal grid rods or tines 75. The shaft 73 also journals a bracket 76 which bridges between the extremities of the first yoke and supports a plurality of vertical grid rods 77. One end of the bracket 76 is provided with an arm 78 which is connected by a spring 79 to the yoke 72 so that the bracket 76 and vertical grid rods 77 tend to tilt forwardly as indicated in Figure 17. A stop pin 80 limits tilting movement of the bracket 76. The lower or cross portion of the pivoted yoke 74 is shaped to form a hamburger bun tray 81 from the rear side of which extends a cam follower 82 adapted to ride under the cam track 31.

The modified assembly 71 operates substantially in the manner of the first described assembly 11 in that the grid rods 75 move from the position shown in Figure 15 to the horizontal position shown in Figure 17. This movement is accomplished by rearwardly and upwardly tilting movement of the bun tray. The forward tilting movement of the vertical grid rods 77 tends to free the hamburger patty therefrom so that the patty rests on the grid rods 75 until stripped therefrom by the stripping rods 42. In order to compensate for the weight of the bun tray 81 and aid forward tilting of the grid rods 77, the upwardly extending leg of the pivoted yoke which carries the grid rods 77 may be provided with a weight 83.

While our machine is intended primarily for the cooking of hamburgers, it should be understood that other types of sandwiches may be prepared; for example, small steaks may be substituted for the hamburger patties, or, sliced or unsliced wieners may be inserted. Also, other types of ground or prepared meat, or meat substitutes comparable to a hamburger patty in size and form, may be cooked. Still further, the bread slices may be substituted for buns and, if desired, cheese slices may be placed thereon.

It also should be observed that the arrangement of electrodes and reflectors shown are illustrative only and that the location and arrangement may be altered to meet specific conditions of operation and, further, other types of heating means may be adopted.

Having fully described our invention, it is to be understood that we do not wish to be limited to the details herein set forth but our invention is of the full scope of the appended claims.

We claim:

1. An automatic hamburger preparing apparatus comprising: a conveyer structure defining an endless horizontal path of travel; a plurality of hamburger patty clamping units carried by said conveyer, each clamping unit including a substantially upright grid with vertical tines, and a movable grid having horizontal tines arranged with free ends trailing with respect to the direction of travel of the clamping unit; cam means extending along the course of said conveyer structure; cam followers carried by said clamping units, said cam means and cam followers cooperating to open and close the grids of said clamping units when traversing a predetermined region of the path of travel of said conveyer structure; and cooking means confronting said clamping units in that region of said path of travel wherein said clamping units are in their clamping position.

2. An automatic hamburger preparing apparatus comprising: a conveyer structure defining an endless horizontal path of travel; a plurality of hamburger patty clamping units carried by said conveyer, each clamping unit including a substantially upright grid with vertical tines, and a movable grid having horizontal tines arranged with free ends trailing with respect to the direction of travel of the clamping unit; cam means extending along the course of said conveyer structure; cam followers carried by said clamping units, said cam means and cam followers cooperating to open and close the grids of said clamping units when traversing a predetermined region of the path of travel of said conveyer structure; cooking means confronting said clamping units in that region of said path of travel wherein said clamping units are in their clamping position; and a hamburger bun carrier below each clamping grid disposed to expose said bun to said cooking means and cause said bun to receive drippings from said hamburger patty clamped by said grid.

3. An automatic hamburger preparing apparatus comprising: a conveyer structure defining an endless horizontal path of travel; a plurality of hamburger patty clamping units carried by said conveyer, each clamping unit including a substantially upright grid with vertical tines, and a movable grid having horizontal tines arranged with free ends trailing with respect to the direction of travel of the clamping unit; cam means extending along the course of said conveyer structure; cam followers carried by said clamping units, said cam means and cam followers cooperating to open and close the grids of said clamping units when traversing a predetermined region of the path of travel of said conveyer structure; and a plurality of fixed inclined rods forming a discharge chute, the horizontal tines of said clamping unit adapted to intermesh with said inclined rods on opening of said clamping unit to cause said inclined rods to strip hamburger patties from said horizontal tines.

4. An automatic hamburger preparing apparatus comprising: a conveyer structure defining an endless horizontal path of travel; a plurality of hamburger patty clamping units carried by said conveyor, each clamping unit including a substantially upright grid with vertical tines, and a movable grid having horizontal tines arranged with free ends trailing with respect to the direction of travel of the clamping unit; cam means extending along the source of said conveyer structure; cam followers carried by said clamping units, said cam means and cam followers cooperating to open and close the grids of said clamping units when traversing a predetermined region of the path of travel of said conveyer structure; a plurality of fixed inclined rods forming a discharge chute, the horizontal tines of said clamping unit adapted to intermesh with said inclined rods on opening of said clamping unit to cause said inclined rods to strip hamburger patties from said horizontal tines; cooking means confronting the closed grids and a hamburger bun carrier below each clamping grid disposed to expose said bun to said cooking means and cause said bun to receive drippings from said hamburger patty clamped by said grid.

5. An automatic hamburger preparing apparatus comprising: a conveyer means defining a horizontal path of travel; a cam track extending along said path of travel; a plurality of hamburger patty carrier assemblies mounted on said conveyer means; each assembly including a pair of cooperating grids adapted to define vertical planes and clamp a hamburger patty therebetween, one of said grids being movable to and from a horizontal position to permit removal and replacement of a hamburger patty; cam follower means cooperating with said cam track to effect opening and closing of said grid; and heating elements disposed along the path of said conveyer means to cook a hamburger patty clamped between said grids; said movable grid having horizontal tines open at their trailing ends with respect to the direction of travel of the carrier assembly; and a plurality of rods adapted to intermesh with said movable grid as said grid moves toward its horizontal position to strip a hamburger patty therefrom.

6. An automatic hamburger preparing apparatus comprising: a conveyer means defining a horizontal path of travel; a cam track extending along said path of travel; a plurality of hamburger patty carrier assemblies mounted on said conveyer means; each assembly including a pair of cooperating grids adapted to define vertical planes and clamp a hamburger patty therebetween, one of said grids being movable to and from a horizontal position to permit removal and replacement of a hamburger patty; cam follower means cooperating with said cam track to effect opening and closing of said grid; heating elements disposed along the path of said conveyer means to cook a hamburger patty clamped between said grids; and a hamburger bun tray disposed below each hamburger patty clamping grid to dispose a hamburger bun in position to receive drippings from said hamburger patties, said bun tray being tiltable as said clamping grids are opened to discharge the hamburger bun therefrom.

7. An automatic hamburger preparing apparatus comprising: a conveyer means defining a horizontal path of travel; a cam track extending along said path of travel; a plurality of hamburger patty carrier assemblies mounted on said conveyer means; each assembly including a first grid having upright tines, a second grid having horizontal tines, said second grid movable between a hamburger patty clamping position confronting said first grid and a horizontal open position for removal and replacement of hamburger patties; a plurality of rods adapted to intermesh with said movable grid as said grid moves toward its horizontal position to strip a hamburger patty therefrom; a cam follower means cooperating with said cam track to effect opening and closing of said grid; and heating elements disposed along the path of said conveyer means to cook a hamburger patty clamped between said grids.

8. An automatic hamburger preparing apparatus, as set forth in claim 7 wherein: said grids are mounted on a common frame pivotable about a horizontal axis, and said first grid is pivotally connected with said frame, and wherein means is provided to restrain said first grid in a substantially vertical position during movement of said second grid between its upright clamping position and said horizontal position.

9. An automatic hamburger preparing apparatus, as set forth in claim 7 wherein: said cam follower is connected with said second grid by a rack and pinion drive means.

10. An automatic hamburger preparing apparatus, as set forth in claim 7 wherein: said grids are supported by a common frame for independent pivotal movement, said first grid being restrained to a limited tilting movement as said second grid moves to its horizontal position thereby tending to cause the hamburger patty to remain on said second grid.

11. An automatic hamburger preparing apparatus, as set forth in claim 7 wherein: said grids are supported by a common frame for independent pivotal movement, said first grid being restrained to a limited tilting movement as said second grid moves to its horizontal position thereby tending to cause the hamburger patty to remain on said second grid; and wherein a hamburger bun receiving tray is suspended below the pivotal axis of said second grid for movement between a substantially horizontal position and a vertical position as said second grid moves between its upright and horizontal positions.

References Cited in the file of this patent

UNITED STATES PATENTS

| | | |
|---|---|---|
| 982,881 | Sauters | Jan. 31, 1911 |
| 1,071,925 | Keith | Sept. 2, 1913 |
| 1,215,547 | Juengst | Feb. 13, 1917 |
| 1,677,564 | Murray | July 17, 1928 |
| 1,808,997 | Schroeder et al. | June 9, 1931 |
| 1,854,850 | Linkenauger | Apr. 19, 1932 |
| 2,032,272 | Feltman | Feb. 25, 1936 |
| 2,109,079 | Ziegler et al. | Feb. 22, 1938 |
| 2,171,510 | Stirgwolt | Aug. 29, 1939 |
| 2,207,264 | Neuberger | July 9, 1940 |
| 2,352,447 | Powers | June 27, 1944 |
| 2,561,538 | Schultz | July 24, 1951 |